United States Patent [19]

Hilgert

[11] 4,149,133
[45] Apr. 10, 1979

[54] VARIABLE DIFFERENTIAL TRANSFORMER APPARATUS

[75] Inventor: Adolph J. Hilgert, Mequon, Wis.

[73] Assignee: Johnson Controls, Inc., Milwaukee, Wis.

[21] Appl. No.: 842,288

[22] Filed: Oct. 14, 1977

[51] Int. Cl.² ............................................ H01F 21/06
[52] U.S. Cl. ..................................... 336/30; 336/134; 336/136
[58] Field of Search .................. 336/30, 136, 130, 132, 336/83, 134

[56] References Cited

U.S. PATENT DOCUMENTS

| | | | |
|---|---|---|---|
| 2,494,579 | 11/1950 | Pimlott et al. | 336/83 X |
| 2,921,279 | 1/1960 | Cosby et al. | 36/30 |
| 2,922,971 | 1/1960 | Jeglum | 336/30 |
| 3,092,995 | 6/1963 | Glerum | 336/30 X |
| 3,221,281 | 11/1965 | Roeger | 336/136 X |
| 3,308,411 | 3/1967 | Roshala | 336/30 |
| 3,376,533 | 4/1968 | Chass | 336/136 |
| 3,480,896 | 11/1969 | Neuman | 336/136 X |
| 3,613,514 | 10/1971 | Melchior | 336/30 |

Primary Examiner—Thomas J. Kozma
Attorney, Agent, or Firm—Andrus, Sceales, Starke & Sawall

[57] ABSTRACT

A linear variable differential transformer includes a primary winding and two secondary windings in spaced stacked relation on a core unit. The core unit includes similar cup-shaped pot cores mounted in opposed opening relationship and having abutting cylindrical outer walls and spaced cylindrical inner walls define an annular chamber within which the windings are located. A core axis located within the central air gap between the inner walls and terminates in close relation to the windings. A movable stem couples the core to a pressure diaphragm transducer to locate the core in accordance with pressure.

21 Claims, 5 Drawing Figures

U.S. Patent  Apr. 10, 1979  4,149,133
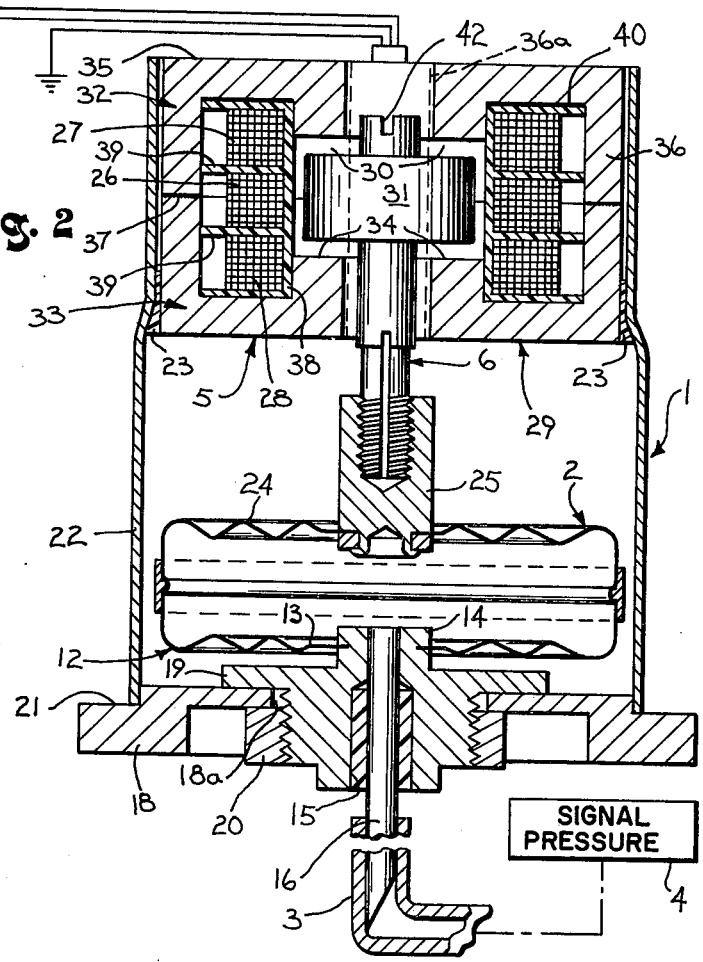
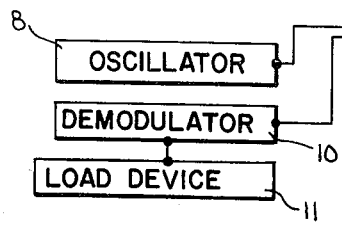
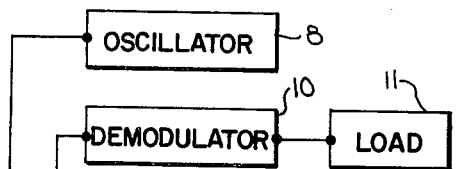
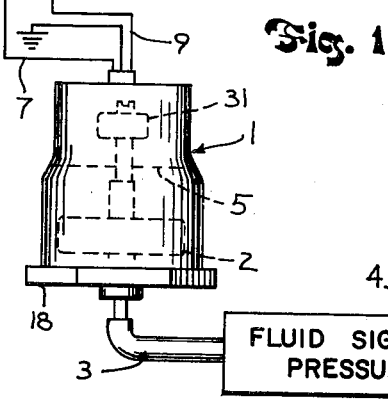
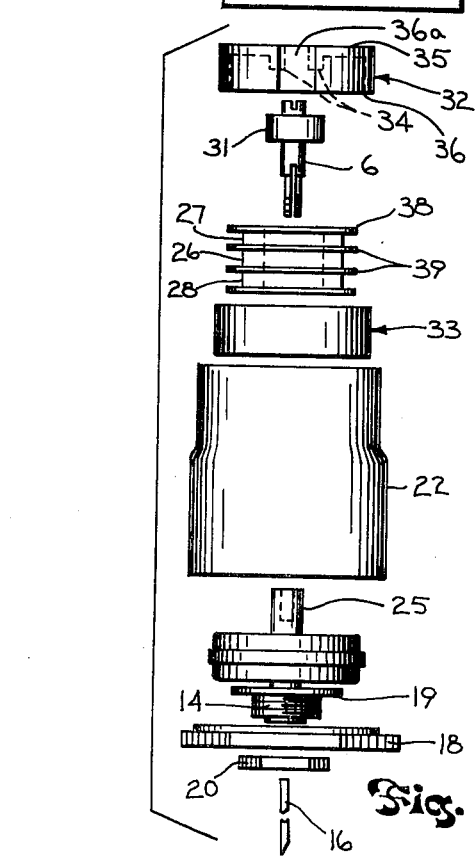
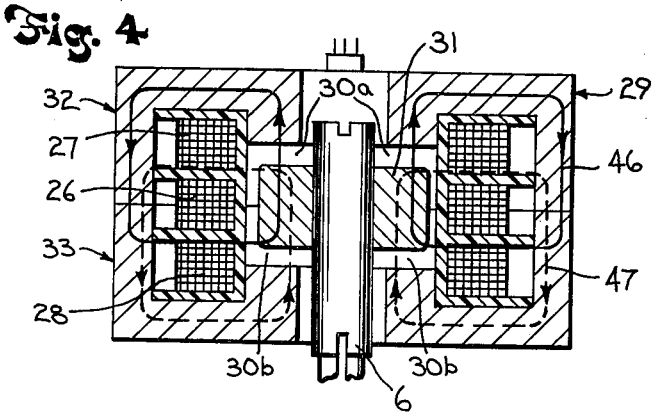
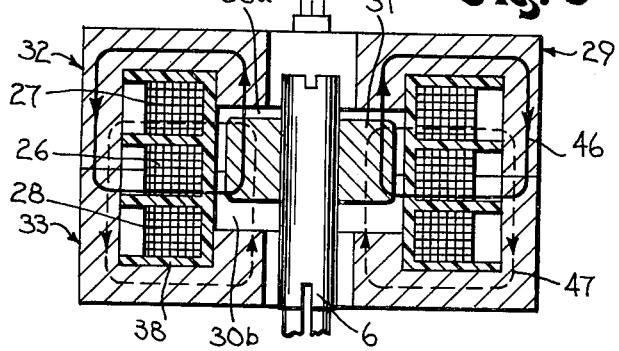

VARIABLE DIFFERENTIAL TRANSFORMER APPARATUS

BACKGROUND OF THE INVENTION

This invention relates to a linear variable differential transformer for generating an electrical output signal in accordance with a sensed position related or transduced signal.

A variably positioned means, or any variable which can be converted to a related position movement, may be transduced to an electrical signal by coupling the positioned means to a linear voltage differential transformer. Generally, such a transformer includes a centrally located primary winding with a pair of secondary windings located to the opposite side of the primary. The secondary windings are connected in series opposition such that the induced voltages, resulting from energizing of the primary winding, subtract from each other and produce an output signal equal to the voltage difference. A movable iron core rod is mounted extending across the primary completely and partially across the aligned secondaries to control the coupling of the primary winding to the secondary windings. Generally, as the core rod moves from a centered position, the number of turns of the two secondary windings and the level of flux linkage with the two secondaries varies oppositely and the output voltage of the two secondary windings varies with the position of the core. With the core centered between the two secondaries, the primary flux is essentially similarly coupled to both secondary windings and the output voltages are essentially equal; producing a zero output signal. If the core is positioned to a first limit at which the primary winding is coupled essentially completely to one of the secondary windings, the primary flux is coupled to the total number of winding turns of that secondary winding, and the amount diverted through that secondary winding is increased providing a corresponding relatively large output voltage. The opposite secondary would effectively be decoupled and an insignificant output voltage would be created therein. By moving of the core to the opposite limit, a reverse voltage signal is generated.

In a practical construction, the primary coil is energized from a suitable high frequency oscillator source, while the secondary windings are connected in series to a suitable demodulator circuit to produce a resultant DC voltage signal.

The linearity of the output is dependent upon employing essentially identical secondary coils which are accurately mounted with respect to the primary to effect the similar coupling and decoupling in response to the positioning of the core. Further, the movable core rod necessarily results in a significant air gap in the structure resulting in a reluctance characteristic which minimizes the output signal. Generally, sophisticated sensing circuitry is required to provide an appropriate output signal. High nickel alloy magnetic frames have been used with the core rod extended substantially between the ends. Such structures have generally been constructed to sense a very small movement as the opposite ends of the rod move relative to the end face frame members. Further, they have used very special magnetic materials which are costly.

There is, therefore, a need for a compact and inexpensive linear differential transformer which can sense intermediate degress of movement, particularly for use as a transducer in which a variable is converted into a motion and in which the amplitude of movement can be selected.

SUMMARY OF THE PRESENT INVENTION

The present invention is particularly directed to a linear, variable differential transformer having an improved core assembly for establishing a linear output over a significant range of movement and with a high gain and which is economically constructed. Generally, in accordance with the present invention, a primary winding and two secondary windings are coaxially wound in suitably, slightly spaced stacked relation. The windings are wound and located within a sintered low reluctance core unit which is generally an annular or doughnut shaped member. The inner axial wall of the core unit includes a central opening or gap between a pair of inner core legs. The gap is generally centrally aligned with the primary winding and the adjacent portions of the two secondary windings. The core unit is formed in a particularly unique and practical structure, by a pair of similar cup-shaped pot cores having a long outer wall or leg longer than the inner wall or leg. The cores are mounted in opposed opening relationship with the outer legs abutting and the central legs spaced to define the annular chamber within which the windings are located, with the gap formed by the spaced inner legs. A movable annular core is located within the central air gap of the core unit and terminates in closed spaced relation to the inner periphery of the winding assembly. The movable core is coupled to a coupling stem or member which projects outwardly of the core unit and is connected to a suitable position sensitive device. For example, in a highly practical application of the present invention, the movable core stem is coupled to a metal diaphragm. A pressure signal is applied to the diaphragm to position the diaphragm and, therefore, the stem and core in accordance with the pressure level. The assembly is then a pressure to an electrical signal transducer, and the output of the differential transformer is a voltage signal linearly related to the pressure signal.

The winding core and the movable core are formed of a highly magnetic material to produce a very minimum reluctance in the magnetic path. As a result, the flux paths are concentrated and well defined, with minimum flux leakage. The central location of the movable core relative to the stacked windings results in essentially zero output signal as in the conventional linear transformer. The primary winding establishes a pair of flux loops, each passing through the movable core, the fixed core about a different one of the secondaries, and the primary coil. As the movable core shifts toward one adjacent center leg of the winding core unit, the air gap with that leg is reduced and simultaneously the opposite air gap of the opposite leg is increased by the same distance. The flux in the one loop increases and the through flux in the opposite loop decreases by essentially the same amount with a linear variation in the output.

In an embodiment requiring a single polarity output, the secondary windings or coils may be wound with a different number of turns and the movable core offset from alignment with the primary coil to establish the minimum output. This minimizes the total air gap length while permitting construction of the core structure from the same individual core members.

The apparatus uses readily available and standard components permitting ready mass production of a low cost linear variable differential transformer having a highly linear and accurate output. As applied to a pressure transducer employing a diaphragm unit input, the core structure provides a stable, lightweight unit providing a very sensitive output.

BRIEF DESCRIPTION OF THE DRAWING

The drawing furnished herewith illustrates a preferred construction of the present invention in which the above advantages and features are clearly disclosed as well as others which will be readily understood from the following description.

In the drawing:

FIG. 1 is an elevational view of a pressure to electrical transducer incorporating a linear differential transformer constructed in accordance with the teaching of the present invention;

FIG. 2 is an enlarged, vertical central section through the transducer;

FIG. 3 is an exploded pictorial view of the differential transformer unit shown in FIGS. 1 and 2; and FIGS. 4 and 5 are vertical sections through the differential transformer showing the flux paths in the movable core.

DESCRIPTION OF THE ILLUSTRATED EMBODIMENT OF THE INVENTION

Referring to the drawing, and particularly to FIGS. 1 and 2, a pressure-to-electrical transducer 1 is illustrated including a pressure responsive positioning unit 2 with a fluid signal line or tube 3 connected to a pneumatic signal source 4. A differential transformer unit 5 constructed in accordance with the teaching of this invention includes a movable stem 6 coupled to the unit 2 and positioned thereby. The transformer unit 5 is connected by a lead 7 and a common ground to a high frequency oscillator 8 adapted to be driven from any suitable power supply. The output of the transformer unit 5 is an alternating current signal which is connected via output lead 9 to a demodulator 10, in accordance with well-known constructions, to provide a DC output signal which can be connected to any suitable electrical signal, indicating or control device 11.

Referring particularly to FIG. 2, the positioning unit 2 is a diaphragm chamber unit 12 presently employed for sensing pressure and producing a corresponding mechanical motion.

The diaphragm unit is a conventional metal capsule diaphragm having a lower wall 13 to which a centrally located inlet or signal fitting 14 is secured. The fitting 14 has a central opening 15 with connecting needle 16 secured therein and projecting outwardly for connection to tube 3. The fitting 4 is mounted in a base support wall 18 of an outer housing. The support wall 18 is a rigid member having a central opening 18a. The inlet port fitting 14 includes a mounting hub or flange 19 located in abutting engagement with mounting or base wall. The fitting 14 extends through the opening 18a and is threaded to receive a clamping nut 20 which with the flange 19 firmly clamps the inlet port to the base wall 18 and physically supports the diaphragm unit. The wall 18 is generally an annular member having an outer edge recess 21. A cylindrical wall 22 is secured in the recessed wall and projects upwardly about the diaphragm, in slightly spaced relation thereto. The upper end of the cylindrical wall 22 is formed with a reduced cross-section and is located in close spaced relation to the transformer unit 5. The lower end of the unit 5 is firmly affixed to the wall 22 by a suitable epoxy or other adhesive 23 with the transformer unit in spaced relation to the diaphragm unit 12. The top wall 24 of the diaphragm unit is provided with a threaded hub 25 and a stem 6 is threadedly secured therein and extends upwardly to the transformer unit 5.

The present invention is particularly directed to the structure of the differential transformer unit 5. Consequently, no further description of the other circuit or other components is given other than is necessary to clearly describe the present invention.

The transformer unit 5 generally includes a centrally located primary winding 26 and a pair of series connected secondary windings 27 and 28 located one each to the opposite side of the primary winding. The windings 26 - 28 are located within a fixed annular core 29 having an axially extended air gap 30 in the inner portion of the core. The movable core 31 is located coaxially therein and is coupled to the diaphragm unit by the stem 6 for relative positioning axially of the primary winding 26. The output of the secondary windings 27 - 28 is directly controlled by the coupling to the primary winding 26 as a result of the axial positioning of the movable core 31.

More particularly, the annular or doughnut-shaped fixed core 29 is constructed of a magnetic material having a significant permeability to minimize the reluctance of the magnetic paths and thereby maximize transformer gain and having a high electrical resistance to significantly reduce the losses at relatively high frequencies such as 10 K hz and above. The core is, in accordance with an optimum construction of the present invention, formed from a pair of similar sintered core members 32 and 33, as clearly shown in FIGS. 2 and 3.

Referring to core member 32, it is a pot or cup-shaped core having a generally C-shaped cross-section. The core member 32 includes a relatively short inner or center leg 34 connected by an end face base 35 to a relatively long outer or peripheral leg 36 which extends substantially beyond the end of the relatively short inner leg 34. The inner leg 34 is shown with a substantially greater thickness or width, in accordance with known construction, to maintain distributed flux density with the smaller radius. Each core also has aligned axial grooves 36a on opposite outer portions for exit of leads 7 and 9. The inner and outer legs 34 and 36 are parallel.

Each core member 32 and 33 is preferably a commercially available sintered pot core such as manufactured and sold by the Ferrox Company as a Ferrox cube No. 221 3PA-3B7, for use in high frequency inductors and fixed, static transformers used in solid state electronic circuitry. The cores are formed in a wide range of standard sizes which can be obtained with the inner legs of any desired length including the relative large air gap used in this invention.

The two cup-shaped core members 32 and 33 are mounted in opposed relation with the outer peripheral legs 36 in abutting engagement. The abutting ends of the legs 36 are preferably joined by a suitable thin layer adhesive 37 to form the annular transformer core defining an inner, annular chamber of a generally rectangular cross-section within which the windings 26 - 28 are wound.

In the illustrated embodiment of the invention, the primary and secondary windings 26 - 28 are each wound with a generally rectangular cross-section in a non-magnetic form or bobbin 38. The bobbin 38 includes an inner cylindrical base and radially outwardly projecting walls 39 defining a central chamber for the primary winding 26 and adjacent end chambers for each of the secondary windings 27 and 28. The bobbin 38 thus essentially conforms to the chamber defined by the core members 32 and 33. The base of bobbin 38 essentially corresponds to and abuts the inner diameter defined by the central legs 34 of the cores. Thus, in assembly the windings 26 – 28 are wound in the winding form 38 and the two core members 32 and 33 assembled about the winding form 38. A suitable adhesive 40 similar to adhesive 37 bonds the bobbin within the core 29 with the bobbin abutting the legs 34 to hold the geometry of assembly.

The movable core or armature 31 is a solid disc located within the air gap 30 with an outer diameter slightly less than the inner diameter of bobbin 38 for close coupling to the windings 26 – 28 and alignment with the ends of the core legs 34. The movable core 31 extends radially inwardly from the core legs 34 and is adhesively bonded or otherwise secured to the stem 6.

The movable core 31 is preferably made of an 80% nickel magnetic alloy such as Mu metal sold by Alleghaney Ludlum Steel Co., which is readily available. A sintered ferrite disc could be used but such an element is not commercially available and would be relatively expensive to produce.

The high nickel core has lower electrical resistance and, therefore, greater losses than the sintered core. However, the core 31 forms a relatively small portion of the total flux path and has been found to provide a highly satisfactory result at the operating frequency of 10 K hz. Generally, such a system should operate satisfactorily at 15 K hz and if a sintered core is used the frequency can be substantially increased.

The movable core 31 has a center opening within which the stem 6 is securely affixed. The stem 6 is formed of aluminum or other non-magnetic material and extends coaxially through the center opening of core 29. The lower end of the stem 6 is threadedly connected to the hub member 25 on the diaphragm wall 24 for initial adjustment or setting of the core member. The opposite end of the stem 6 is exposed through the central core opening and slotted as at 42 to receive a screw driver or like implement for the core adjustment.

As previously noted the transformer core 32 is physically supported only at the inner end by the localized adhesive attachment 23. The core 32 is highly temperature stable whereas the housing 22 may expand with temperature. The inner end bonding results in movement of the core only to the extent of thermally generated movement of the lower portion of the housing. This minimizes any change in the set point adjustment of the assembly while providing a reliable support of the assembly.

In operation, the pressure level in the diaphragm unit positions the freely movable upper wall and interconnected stem and core. At a set point, the core is symmetrically located in the air gap 30 and the energization of the primary winding 26 creates a flux pattern including first and second flux loops, such as shown in FIG. 4.

The first flux loop 46, starting from the movable core 31, is through the small air gap 30a, the main or fixed core 29, the lower end of the primary coil 26 and back to movable core 31. The secondary loop 47 is similarly concentrated in the movable core 31 across the primary winding 26 to core 29, through gap 30b and back to the core 31.

When the core 31 moves, the flux distribution in the two loops 46 and 47 changes. For example, if the pressure signal increases, the diaphragm unit 2 expands and moves the stem 6 and core 31 upwardly. The length of the upper air gap 30a is shortened and the lower air gap 30b correspondingly increased. This results in a new distribution in the pair of flux loops or paths 46 and 47, which otherwise remain the same such as shown in FIG. 5. The reluctance of loop or path 46 is reduced and the flux therein increases. The reluctance of loop or path 47 is increased and the flux therein decreases.

The changes are due solely because of the change in the length of the air gaps 30 and 30b as core 31 moves and the changes are opposite and equal for corresponding coils. The fluxes 46 and 47, therefore, similarly and inversely change, and, furthermore, will change linearly. The output of the transformer 5, therefore, changes with a corresponding linear characteristic.

The coil turns enclosed by the magnetic flux loops remain constant. Thus, the transformer unit has a single variable, i.e., the flux in the loops resulting from the distribution of the air gap.

The uniformity of the secondary coils or windings 27 and 28 does not affect the accuracy of the transformer output. Thus, the flux paths or loops 46 and 47 are such that the field links with all turns of the respective transformer coils 26 – 28 and the output for any given set of windings 27 and 28 varies linearly with the position of the movable core 31. Although the characteristic of the particular coils changes the output for any particular transformer, the accuracy is not affected and ready adjustment can be made for any such non-uniformity by the set point adjustment.

In order to provide maximum sensitivity, the air gap 30 is made only as large as required to sense a maximum excursion of the diaphragm unit. Where a single polarity output signal is desired, the secondary coils 27 and 28 may, advantageously, be wound with a different number of turns in each coil such that with the core 31 centered, a proper polarity signal is generated. For example, coil 27 may be wound with more turns than coil 28, the latter being wound with a heavier wire to maintain a constant copper volume. The coil 27 would produce a predominating voltage with the core centered and provide a net output signal. The core 31 is then moved from center to produce the reference or zero signal level. In the assumed example, core 31 would be moved downwardly. This produces an enlarged air gap 30a and a reduced air gap 30b. The enlarged air gap 30a, which now constitutes the working air gap, is a greater portion of the total and permits sensing of a maximum movement in that one direction for a given total length.

Where equal, opposite directional signals are desired, the balanced system would, of course, be employed.

The present invention, thus, provides a small, compact differential transformer employing readily available components and producing a linear response and output to the sensed position change such as in the illustrated pressure to electrical signal transducers.

Various modes of carrying out the invention are contemplated as being within the scope of the following claims, particularly pointing out and distinctly claiming the subject matter which is regarded as the invention.

I claim:

1. A position-sensitive linear variable differential transformer apparatus having a primary coil and first and second secondary coils located in stacked relation to the opposite sides of said primary coil and connected in series opposition, comprising a winding core of a low reluctance material and having an inner chamber having a cross-section substantially complementing said stacked coils and having an inner wall, said stacked coils being located in said chamber adjacent the inner wall, said inner wall including a pair of opposed inner core leg portions spaced from each other and axially aligned to define an air gap aligned with the primary winding, said primary winding spanning said air gap, a movable core located in alignment with the opposed inner core leg portions and within said air gap and having a movable support means for selective axial positioning of said core axially within said air gap between the leg portions and thereby the opposite ends of the air gap, said coils and core defining a flux pattern including a pair of flux loops which encompass the primary coil and said secondary coils.

2. The transformer apparatus of claim 1 having a positioning diaphragm chamber unit including a mounting wall and a movable wall, a pressure signal fitting secured to the mounting wall, and a stem member adjustably secured to the movable wall and to the movable core.

3. The transformer apparatus of claim 2 including an outer housing including having an end wall secured to the mounting wall and a tubular side wall extending upwardly in spaced relation to the chamber unit and having an upper reduced end adhesively bonded to only the lower end of the core unit.

4. The transformer apparatus of claim 1 wherein said winding core is a sintered powdered ferrite material.

5. The transformer apparatus of claim 4 wherein said movable core is a high nickel alloy material.

6. The transformer apparatus of claim 4 wherein said windings are wound as annular coils of similar inner and outer diameters and end faces, said coils being located in abutting end-to-end coaxial alignment.

7. The transformer apparatus of claim 6 wherein said movable core is a disc-like member having a non-magnetic stem extending coaxially through a central core opening, said stem being firmly affixed to said core at said opening.

8. The transformer apparatus of claim 1 wherein said secondary coils are wound with a different number of turns, and a position sensitive device coupled to said movable support means, said core has a minimum output position within said air gap adjacent the secondary coil with the lesser number of turns.

9. The linear variable differential transformer apparatus of claim 1 wherein said winding core is formed from corresponding cup-shaped core members, each of said core members having a substantially C-shape with a base connected to an outer leg and and said inner core leg portions being formed by an inner leg substantially shorter than said outer leg, said core members being located in opposed relation and telescoped over said stacked coil assembly with the outer and inner legs aligned.

10. A linear variable differential transformer apparatus having an annular primary coil and first and second annular secondary coils located in stacked relation to the opposite sides of said primary coil and connected in series opposition, comprising a winding core unit including an upper and a lower cup-shaped core, each of said cores having a substantially C-shape with a base connected to an outer leg and an inner leg substantially shorter than said outer leg, said cores being located in opposed relation and telescoped over said stacked coil assembly with the outer and inner legs aligned, said inner legs being spaced to define an air gap therebetween, said primary coil being located spanning the air gap, a movable cylindrical core located between and in alignment with the inner legs and thereby within said air gap and having a movable support means for selective axial positioning within said air gap between a centered position aligned with the primary coil and an off-centered position, said primary coil being operable to create first and second loops in the centered position, said first loop passing through the movable and winding cores and enclosing both the primary and first and secondary coils and said second loop enclosing only the primary coil, said primary coil being operable in an off-centered position to develop third and fourth loops, each of said third and fourth loops enclosing the primary winding and an opposite one of the first and second secondary coils.

11. The transformer apparatus of claim 10 wherein each of said cores is a sintered powdered ferrite material.

12. The transformer apparatus of claim 10 wherein said winding core is a sintered powdered ferrite material and said movable core is a high nickel alloy material.

13. The transformer apparatus of claim 10 wherein said windings are wound as annular coils of similar inner and outer diameters and having flat end faces, said coils being located in abutting end-to-end coaxial alignment, said chamber defined by said cores essentially corresponding to the cross-section of the stacked coils.

14. The transformer apparatus of claim 13 including a winding bobbin with said coils located therein, said bobbin having a tubular base abutting the inner legs and separating plates extended between the coils.

15. The transformer apparatus of claim 14 wherein said movable cylindrical core being an annular core having a central core opening and includes a non-magnetic stem extending coaxially through the central core opening.

16. The transformer apparatus of claim 13 wherein said secondary coils are wound with a different number of turns, and having a position sensitive device coupled to said movable support means, said core has a minimum output position within said air gap adjacent the secondary coil with the lesser number of turns.

17. The transformer apparatus of claim 10 wherein said winding core is a sintered powdered ferrite material, said movable core is selected from the group consisting of a high nickel alloy material and a sintered powdered ferrite material, an annular coil bobbin having three adjacent coil chambers of essentially the same inner and outer diameters and having flat end faces, said coils being located within said chambers in coaxial alignment, said chamber defined by said cores essentially corresponding to the cross-section of the bobbin, and means firmly affixing the bobbin to the core unit.

18. The transformer apparatus of claim 17 wherein said movable cylindrical core is an annular core and includes a non-magnetic stem extending coaxially through a central opening in the annular core.

19. A transformer apparatus of claim 17 having a positioning means for the moving and holding said movable core within said air gap.

20. The transformer apparatus of claim 19 wherein said positioning means includes a closed diaphragm chamber unit having a mounting wall and a movable wall, a pressure signal fitting secured to the mounting wall, and a stem member adjustably secured to the movable wall to the movable core.

21. The transformer apparatus of claim 20 including an outer housing including having an end wall and a tubular side wall, said end wall having an opening, said fitting passing through said opening, means fixedly mounting said mounting wall to said end wall, said core unit having an outer diameter less than said diaphragm chamber unit, said side wall extending upwardly in spaced relation to the chamber unit and having an upper reduced end adhesively secured to only the lower end of the core unit.

* * * * *

UNITED STATES PATENT AND TRADEMARK OFFICE
CERTIFICATE OF CORRECTION

PATENT NO. : 4,149,133
DATED : April 10, 1979
INVENTOR(S) : ADOLPH J. HILGERT

It is certified that error appears in the above-identified patent and that said Letters Patent are hereby corrected as shown below:

[57] Abstract, Line 8      After "core" cancel "axis" and insert --- is ---.

Signed and Sealed this

*Eleventh* Day of *September 1979*

[SEAL]

Attest:

LUTRELLE F. PARKER

*Attesting Officer*     *Acting Commissioner of Patents and Trademarks*